Patented Apr. 1, 1924.

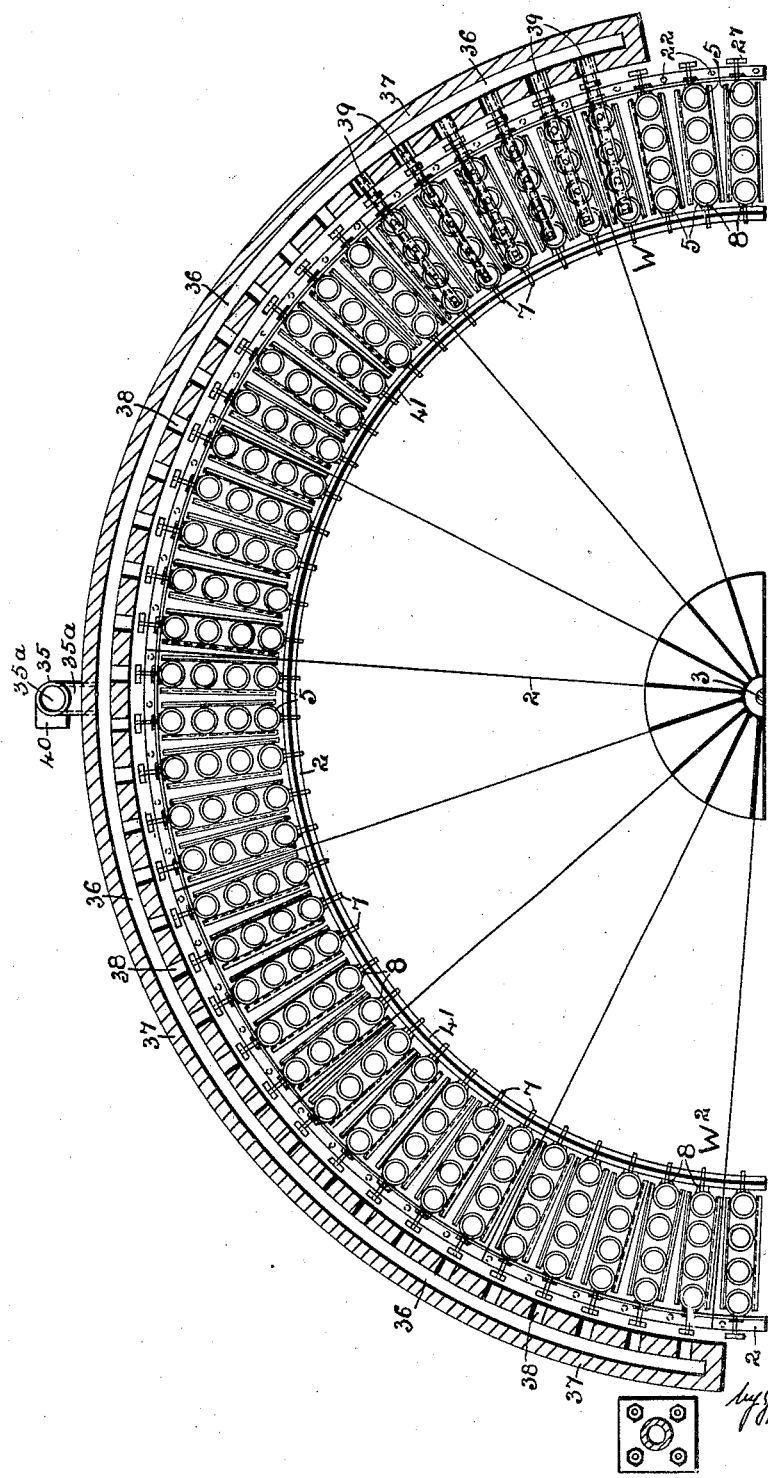

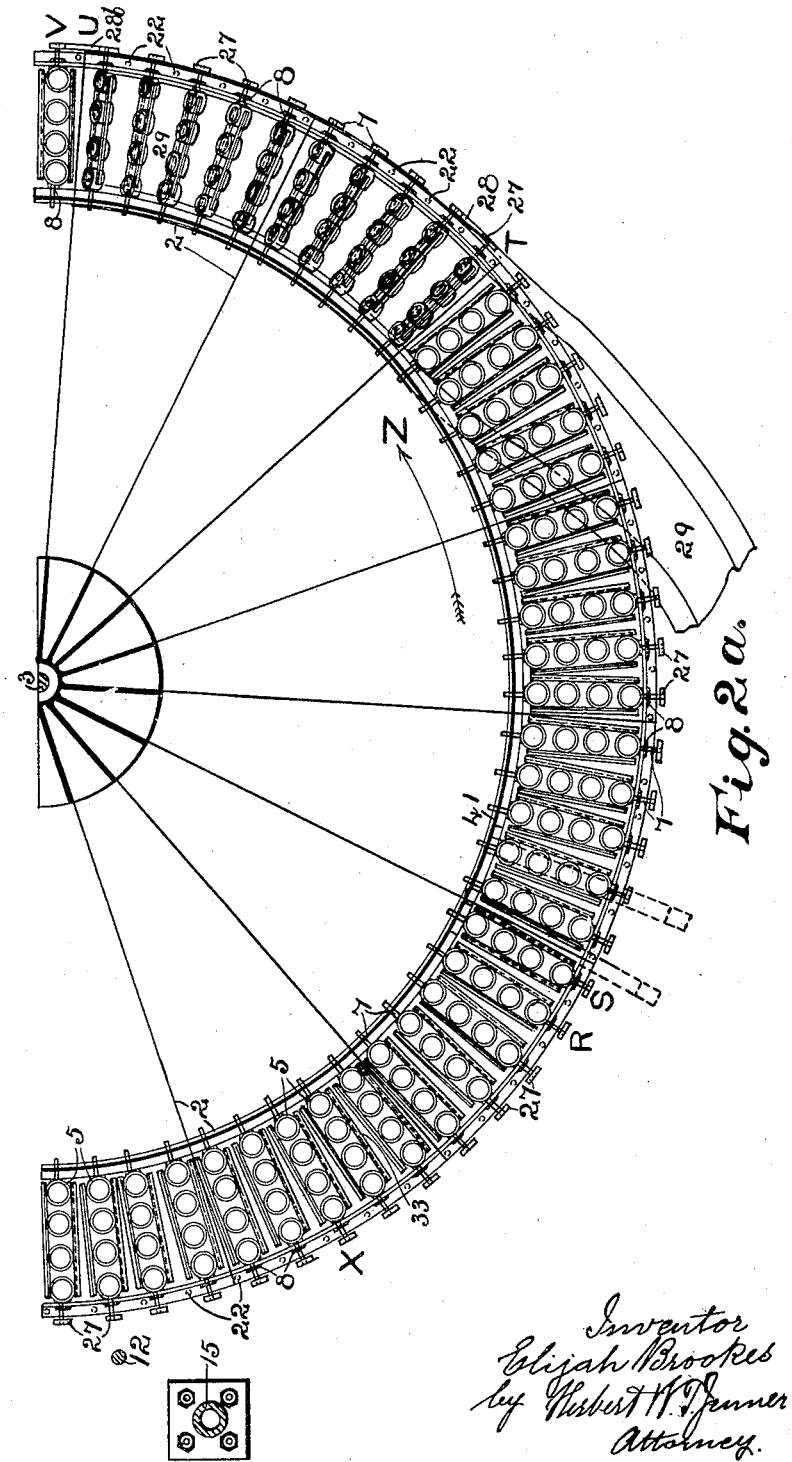

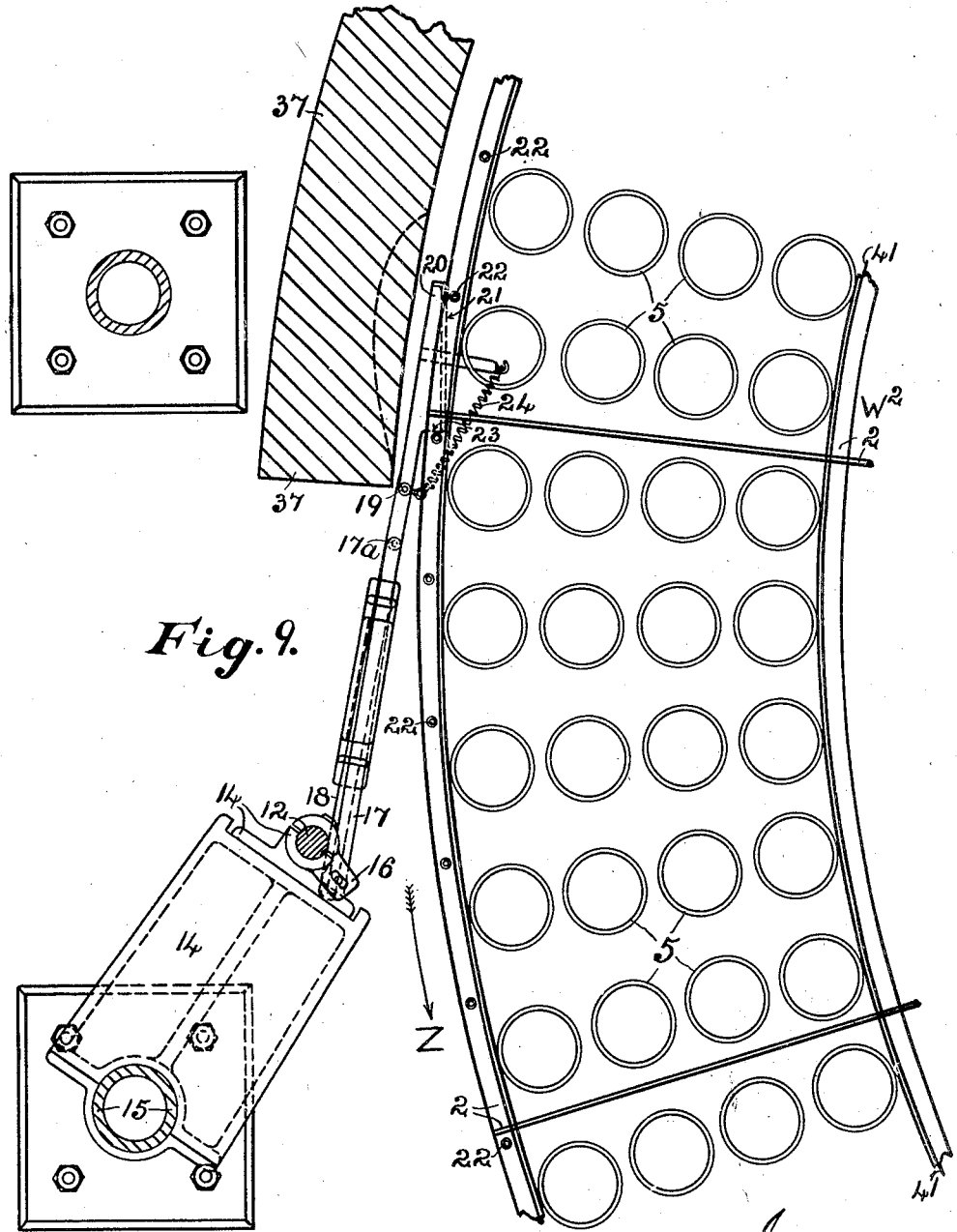

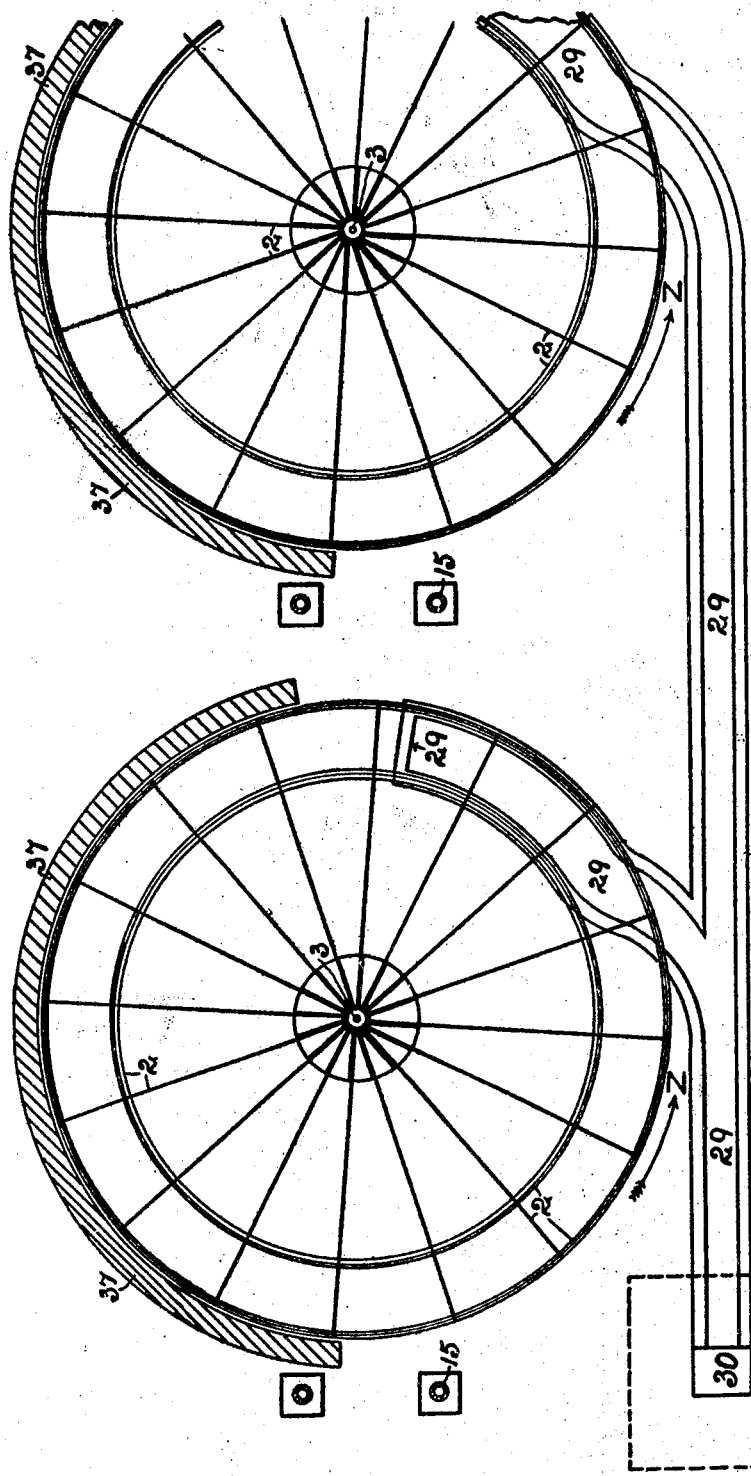

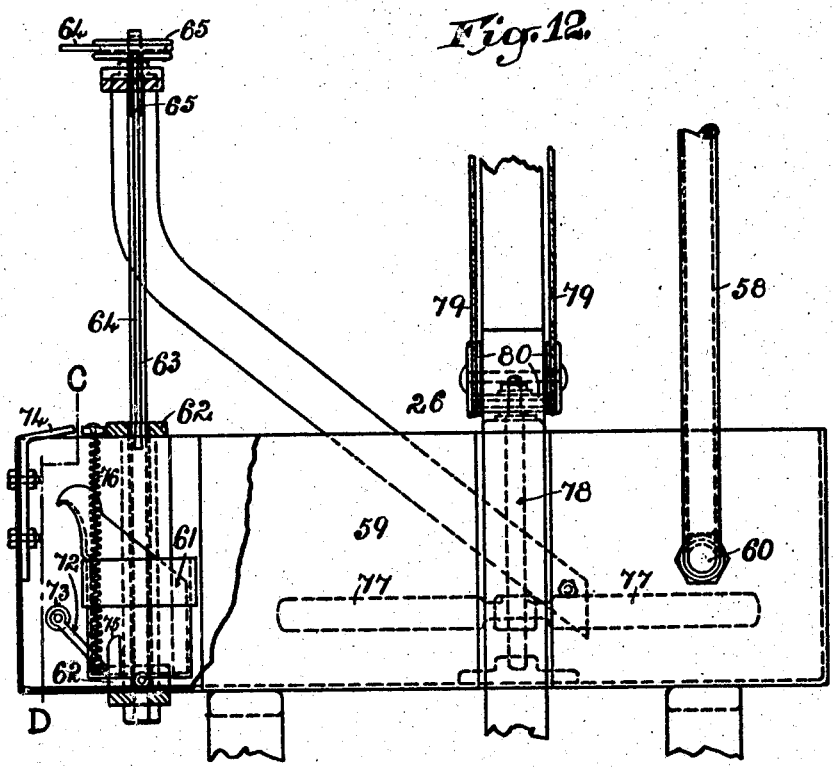
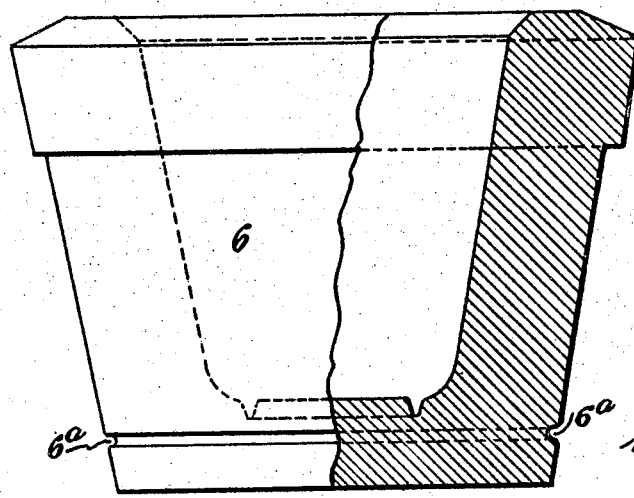

1,488,973

UNITED STATES PATENT OFFICE.

ELIJAH BROOKES, OF STOKE-ON-TRENT, ENGLAND.

METHOD OF AND MEANS FOR MANUFACTURING TEACUPS, BREAKFAST CUPS, AND OTHER VESSELS OR ARTICLES OF POTTERY.

Application filed August 14, 1922. Serial No. 581,642.

*To all whom it may concern:*

Be it known that I, ELIJAH BROOKES, subject of the King of Great Britain and Ireland, and resident of Old House Green, Scholar Green, Stoke-on-Trent, in the county of Stafford, England, earthenware manufacturer, have invented certain new and useful Method of and Means for Manufacturing Teacups, Breakfast Cups, and Other Vessels or Articles of Pottery (for which I have filed application in Great Britain by application for Patent No. 22,094, dated the 20th day of August, 1921), of which the following is a specification.

My invention relates to a new method of and means for manufacturing tea-cups, breakfast cups and other vessels or articles of pottery, the object being to provide a machine to expeditiously and efficiently form such articles.

Figure 1:
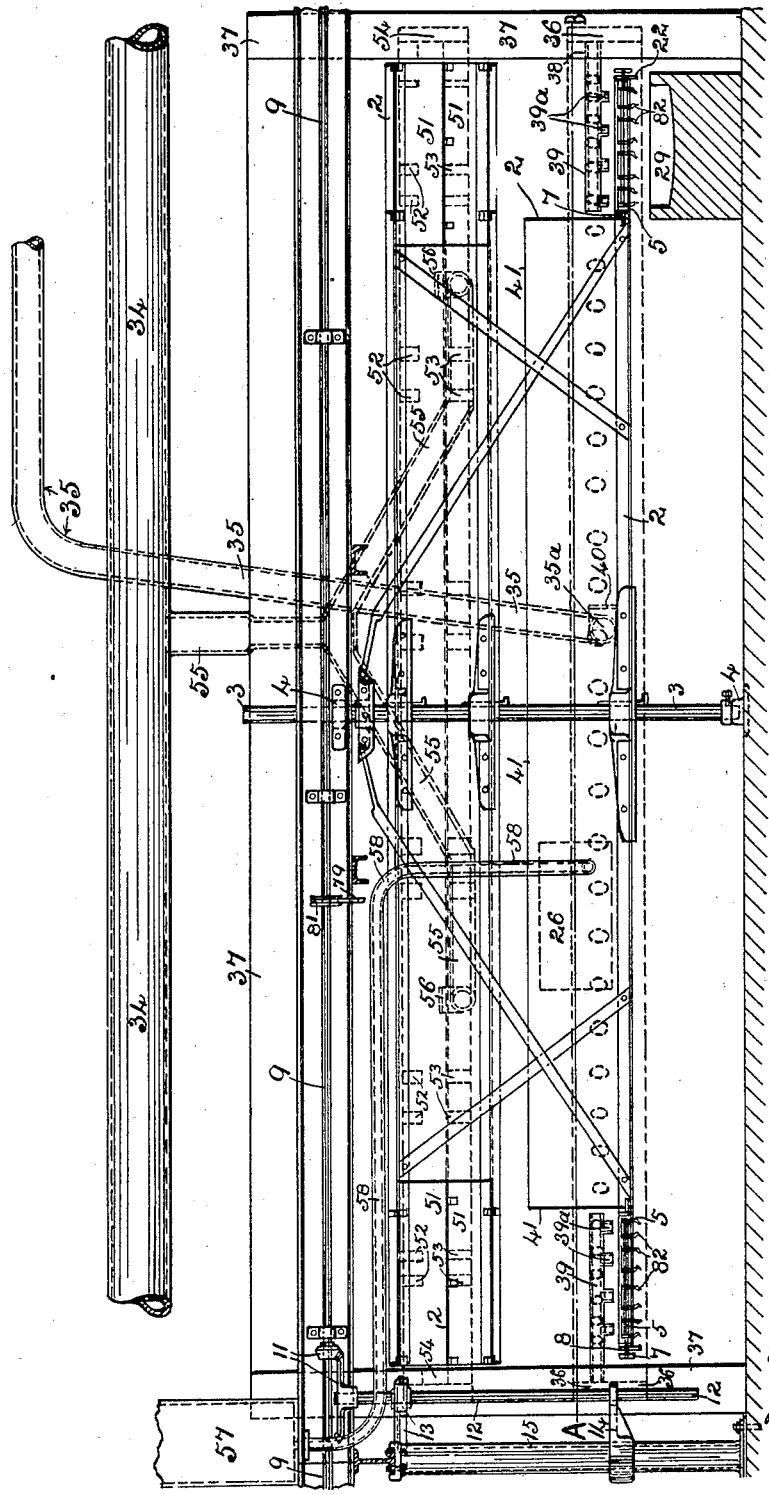
Figure 3:
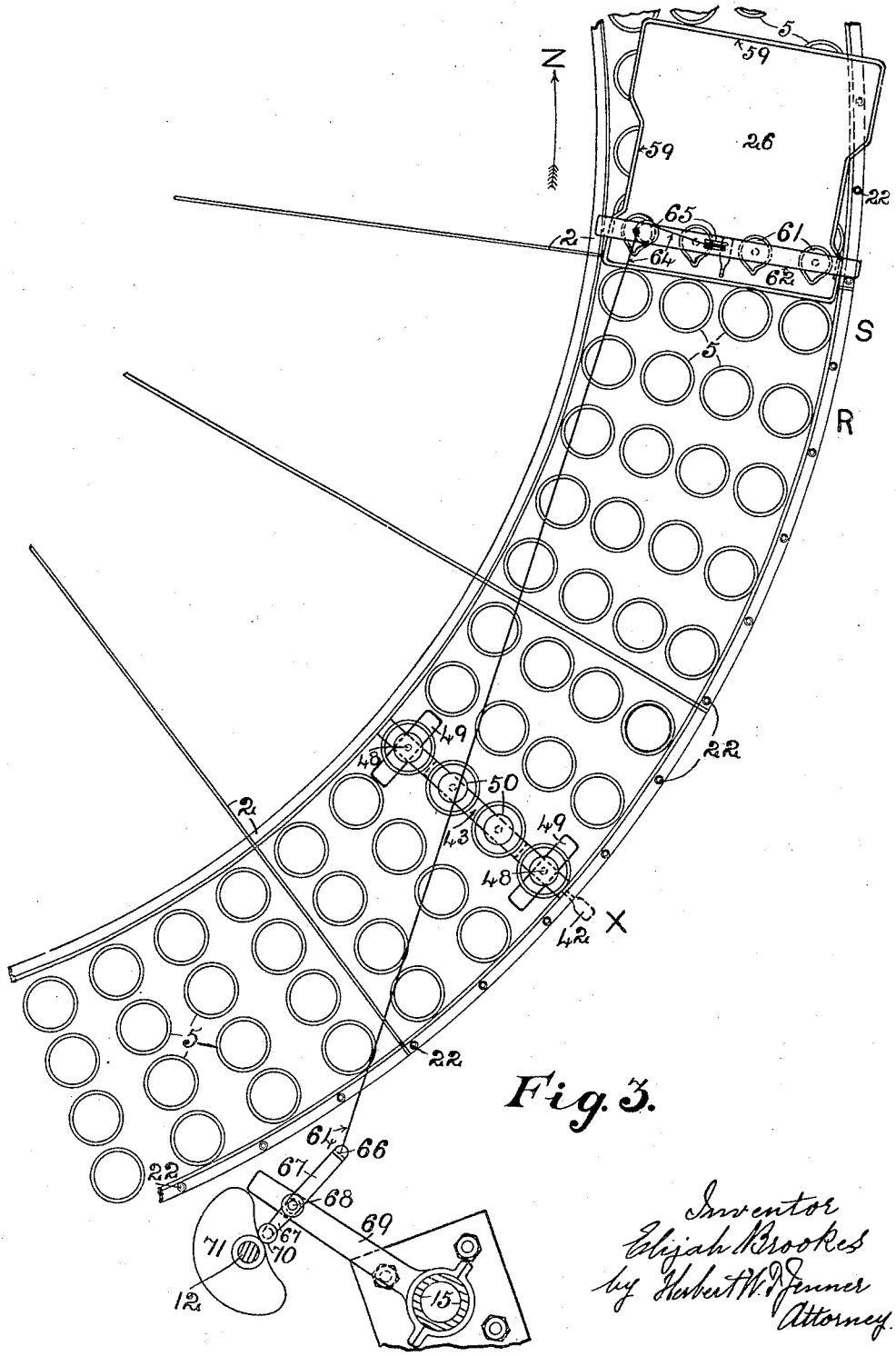
Figure 4:
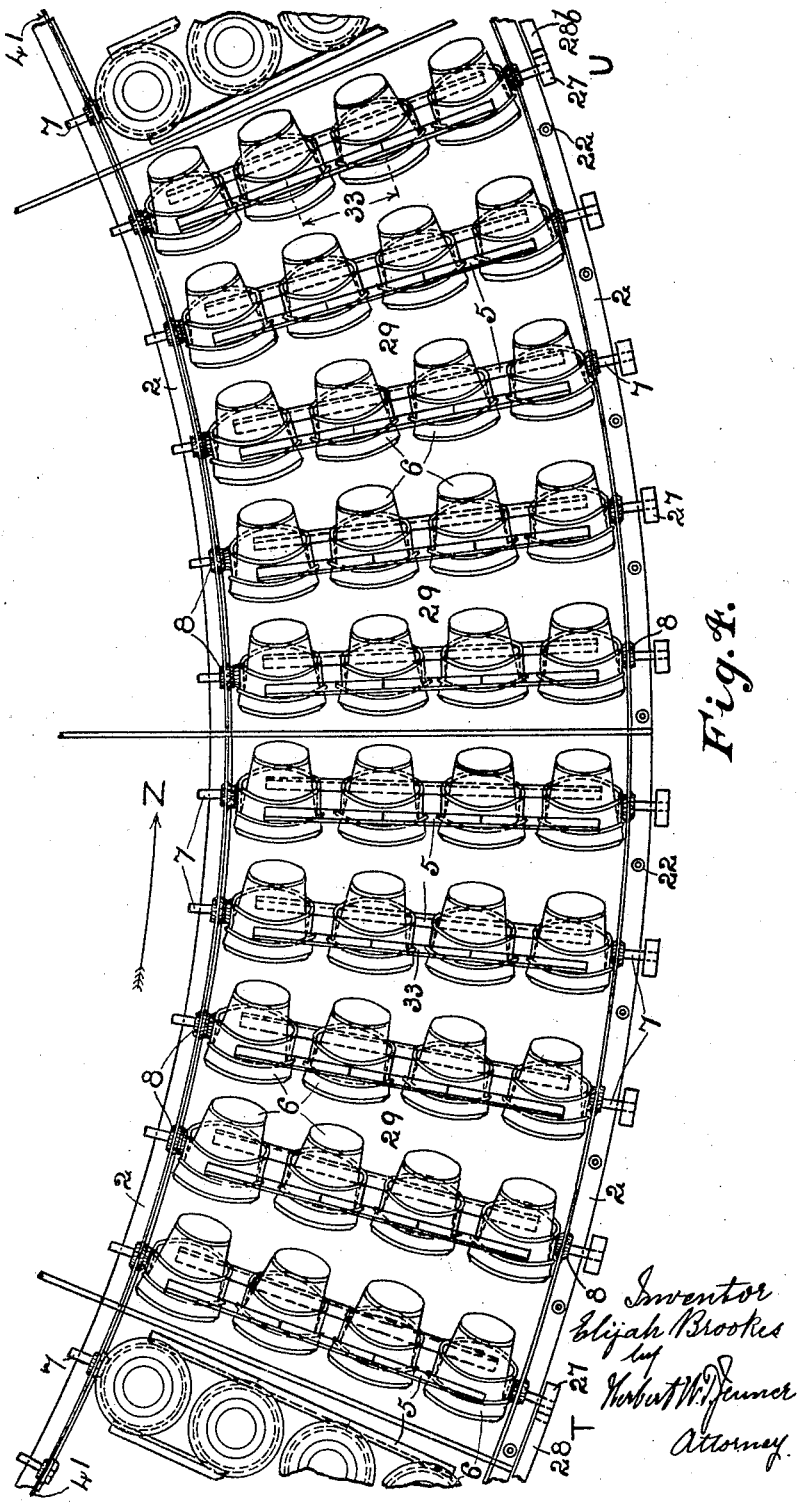
Figure 5:
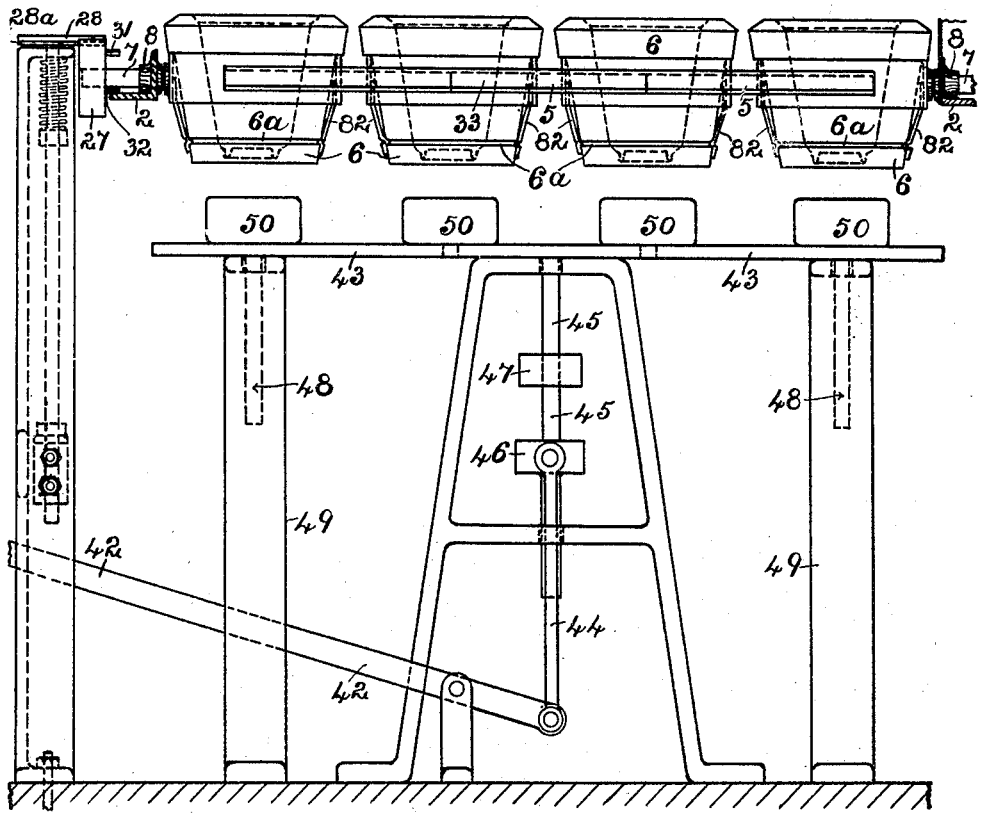

My invention will be fully described with reference to the accompanying drawings in which, Fig. 1 is a sectional elevation of a machine constructed according to this invention, Figs. 2 and 2ª illustrate two half portions of a sectional plan through line A—B of Fig. 1, the two portions when joined together forming the complete sectional plan, Fig. 3 is a sectional plan, of a diagrammatic character, of a portion of Fig. 2ª drawn to an enlarged scale, Fig. 4 is a part plan to illustrate how the plaster moulds are tilted to empty the surplus slip therefrom, Fig. 5 is an elevation, partly in section illustrating the means for dislodging the plaster moulds from their carriers, which will be herein described.

Figure 6:
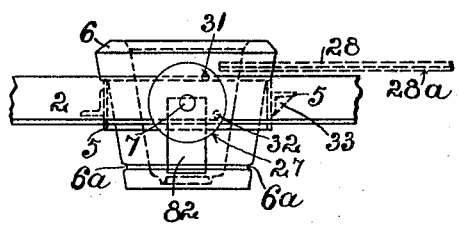
Figure 7:
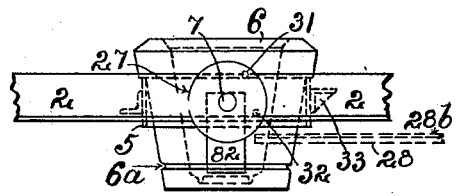
Figure 8:
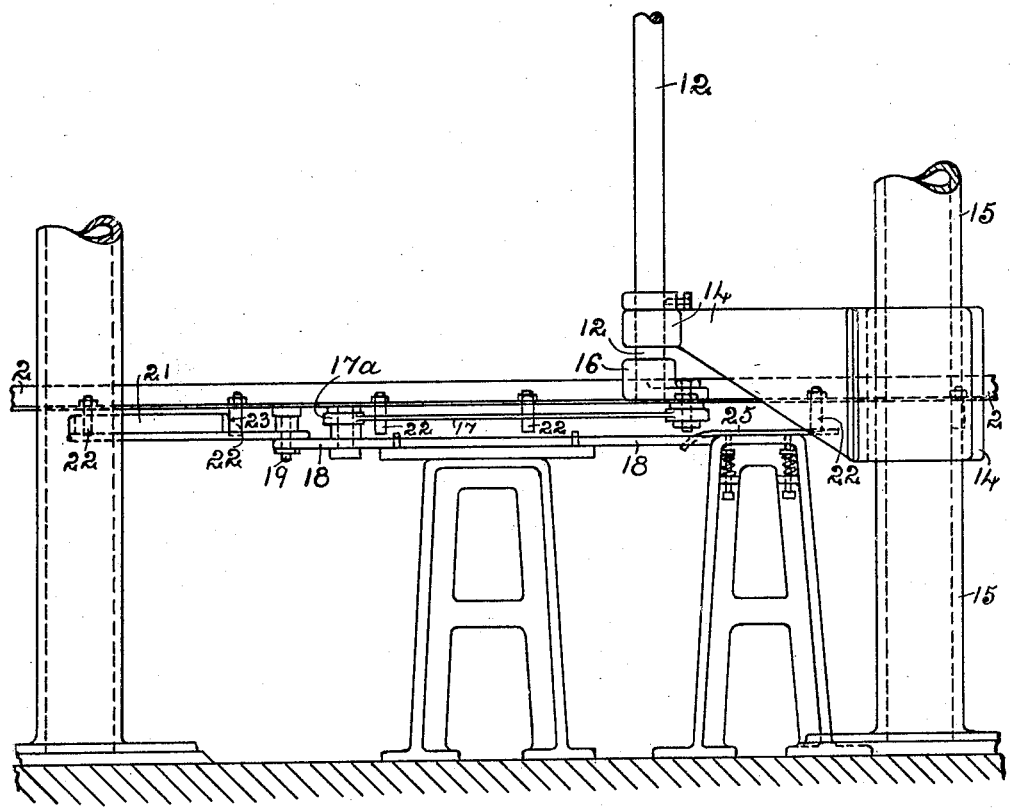
Figure 13:
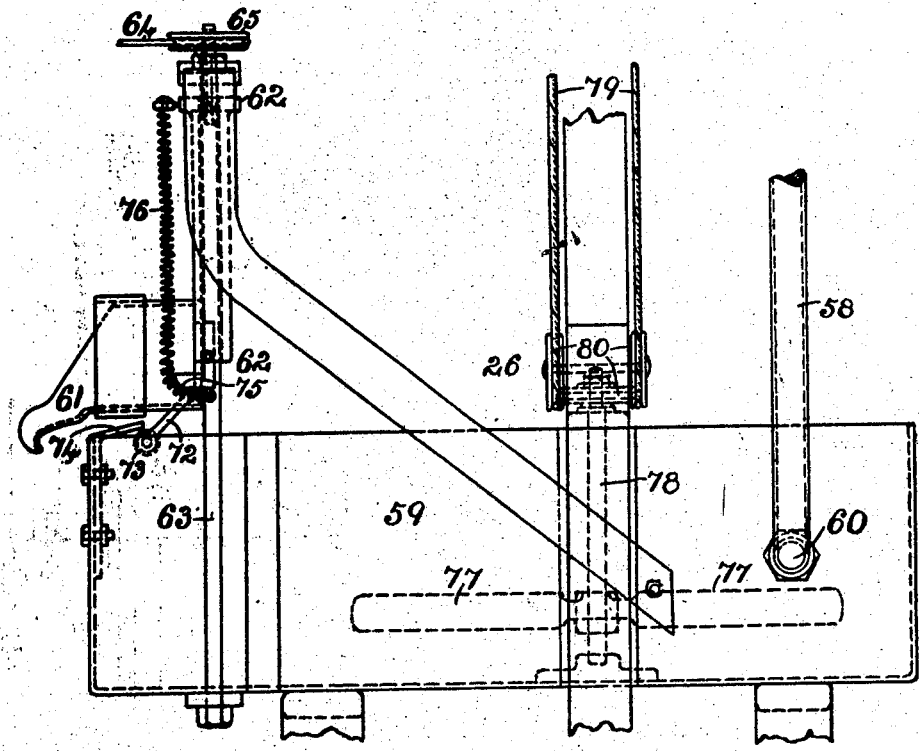
Figure 14:
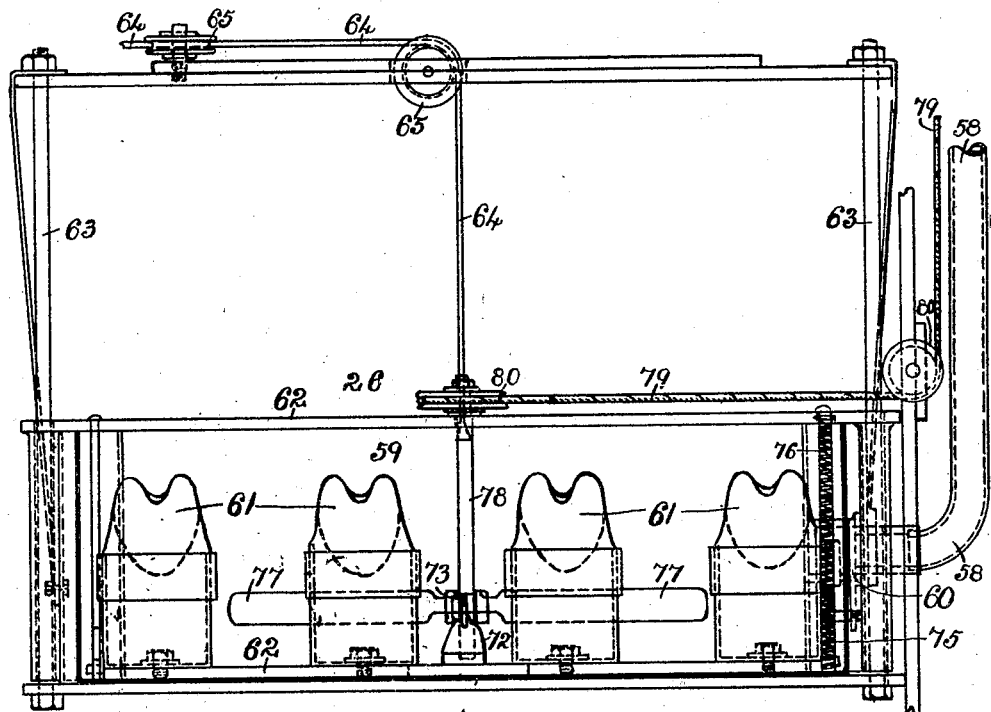

Figs. 6 and 7 are elevations illustrating the means for tilting the mould carriers to remove surplus slip from the plaster moulds, Fig. 8 is an elevation illustrating the mechanism for giving a step by step motion to the machine, Fig. 9 is a diagrammatic plan as seen at right angles to the elevation Fig. 8, Fig. 10 is a diagrammatic plan illustrating two machines and the means for conveying surplus slip therefrom to an ark or well, Fig. 11 is an elevation partly in section, of a plaster mould to form a cup body, several of these moulds being carried by the machine, Fig. 12 is a side elevation, partly in section, of an apparatus for supplying a predetermined quantity of slip to a multiple of plaster moulds simultaneously, Fig. 13 is a similar view to Fig. 12 but showing the parts in position when supplying clay slip, and Fig. 14 is a cross section through line C—D of Fig. 12 looking from the left hand side thereof.

In accordance with my said invention I provide a machine having a skeleton framework 2 of circular formation in plan, rotatable on a vertical shaft 3 carried in bearings 4 (see Fig. 1). The lower part of the said skeleton frame 2 is provided with mould carriers 5 to accommodate plaster moulds 6 (see enlarged view of plaster mould Fig. 11). Any convenient number of such mould carriers 5, may be arranged side by side to tilt on radial centres 7 in bearings 8 on the rotatable frame 2 to enable a series of plaster moulds 6 placed in such carriers 5 to be filled with slip simultaneously by a suitable filling machine which will be herein referred to. As will be seen from the two portions forming the sectional plan of the machine at Figs. 2 and 2ª, the tilting mould carriers 5 are arranged in their bearings 8 in a radial direction and all round the lower circular skeleton framework 2. Each tilting mould carrier 5 illustrated on the drawings is constructed to carry four plaster moulds 6 (see Figs. 4 and 5) the plaster moulds 6 are removed from Figs. 1 and 2 for clearness of other parts.

A step by step motion is transmitted to the skeleton rotatable frame 2 to allow each set of plaster moulds 6 to be filled with clay slip, the skeleton frame 2 moving one step at a time in the direction of the arrow Z. In order to obtain this step by step motion I employ a shaft 9 driven by a belt pulley (not shown) or by other suitable means. The said driven shaft 9 transmits motion, through bevel gearing 11, to a vertical shaft 12 carried in bearings 13 and 14 on a fixed pillar or support 15. A short lever 16 on the vertical shaft 12 is connected by a link 17 having its opposite end 17ª pivotally connected to a slide bar 18 said bar 18 being pivotally connected at 19 to a spring-controlled catch plate 20. As will be seen from the plan (Fig. 9) the spring catch plate 20 is provided with an inclined face 21 which always makes contact with one stud 22. Fig. 9 shows the end of the spring-controlled catch plate 20 in contact with stud 22 and a shoulder 23 against another stud 22 in which position the spring-controlled catch plate 20 is in the act of drawing forward the skeleton frame 2, one step. The return stroke of this mechanism causes the inclined face 21 of the spring-controlled catch plate 20 to move outwards and clear the stud 22 from the shoulder 23 this action not affecting the skeleton frame 2 which is then stationary for a sufficient period to allow one set of plaster moulds to be filled with clay slip. By the mechanism described a step by step motion is transmitted to the skeleton frame 2, so that each set of plaster moulds 6 on each radially arranged carrier 5 are supplied with clay slip. The studs 22 are set at an equal distance apart round the outside edge of the skeleton frame 2 so as to come into the path of the shoulder 23 of the spring-controlled catch plate 20 on the return stroke of the sliding bar 18, the spring 24 always tending to pull the catch plate 20 inwards so that the shoulder 23 meets the stud 22. The distance from one stud 22 to another determines the distance of travel of the skeleton frame 2 at each step, a brake in the form of a spring plate 25 (Fig. 8) automatically arresting the travel of the frame 2 by coming into contact with the underside of each stud 22.

Plaster moulds 6 are placed in the mould carriers 5 at position R Figs. 2ª and 3 the skeleton frame 2 being then moved one step by the mechanism previously described to position S in front of the filling machine 26 (Figs. 3, 12, 13 and 14) the filling machine 26 supplying all the plaster moulds 6 on the one radially arranged carrier 5 simultaneously in a manner to be hereafter described. The filled plaster moulds 6 pass underneath the filling machine 26 to position T (Fig. 2ª) at which point the carrier 5 is partly rotated by a roller 27 thereon coming into contact with the underside 28ª of a spring-controlled plate 28 (see Figs. 5 and 6). The friction of the leather covered plate on the roller 27 causes the radially arranged carrier 5 to tilt over and discharge the surplus slip from the plaster moulds 6, such slip falling into a trough 29 (Figs. 2ª and 10) which conveys it to an ark or well 30. The mould carriers 5 remain tilted for a sufficient period to properly drain the plaster moulds 6, as for example from positions T to U (Figs. 2ª and 4). Immediately each mould carrier 5 reaches position U the roller 27 thereon makes rolling contact with the top 28ᵇ of another leather covered spring-controlled plate 28 (Fig. 7) which moves each carrier 5 to the initial position as shown at position V. Two stop pins 31 and 32 on the inside of each roller 27 (Fig. 5) are provided, the lower stop pin 32 resting on the frame 2 when the carrier 5 is in normal position, whilst the stop pin 31 limits the tilt of the carrier 5. To retain each carrier 5 in its normal position, or the stop pin 32 against the frame 2, the front side of the carrier may be weighted at 33 (Figs. 4, 6 and 7). As the carriers 5 supporting the plaster moulds 6 with the clay articles therein are moved, step by step, from position W, (Fig. 2) a blast of heated air is introduced inside the clay body in each mould. All the clay bodies in the moulds 6 are subject to the blast of heated air whilst they are being conveyed step by step, from position W to position W². The introduction of a blast of heated air to the clay bodies in the moulds 6 forms an important feature of this invention, the air so introduced forcing moisture out of each clay body or cast article enabling it to be expeditiously removed from the plaster moulds 6. The heated air from a high pressure fan (not shown) is conveyed from a tunnel oven or from any other suitable source through the pipe 35 which may be of the length to supply heated air to two or more machines, but I will describe how the heated air is introduced to one machine only. From the main heat supply pipe 35 the heat is conveyed into a chamber 36 formed in a wall 37 which extends nearly half way round the circular skeleton frame 2. The said hollow wall 37 is perforated at 38, the perforations being arranged at suitable intervals along the inner side of the wall 37 to accommodate radially arranged pipes 39 closed at their inner ends and provided with nozzles 39ª, (Fig. 1) one nozzle to extend over each clay body in the mould 6 in the carriers 5 shown at Fig. 2. Six radially arranged pipes 39 are only shown in plan at Fig. 2 but it must be understood that such heat blast pipes 39 are arranged from position W to W² which is approximately the whole length of the curved wall 37 forming the heat chamber 36. A damper 40 is arranged at the lower end 35ª of the pipe 35 to cut off or control the supply of hot air. To retain the heat in close proximity to the mould carriers 5 an annular ring 41 forming part of the skeleton framework 2 is provided, the ring 41 being of sufficient depth for the purpose specified. From position W² (Fig. 2) the mould carriers 5 travel forward, step by step, to position X (Fig. 2ª) when the moulds 6 in each carrier 5, are raised by means of a foot-lever 42 (see Figs. 3 and 5). When the operator applies pressure to the foot-lever 42 the plate 43 (Fig. 5) is raised through its connection by link 44 with a fixed rod 45 secured to the plate 43. The said rod 45 is provided with a weight 46, a stop 47 being provided on the rod 45 to limit the upward stroke. Guide rods 48 fixed to the plate 43 move in the frames 49 so that the plate 43 is raised vertically. Wood buffers 50 secured on the plate 43 make contact with all the bottoms of the plaster moulds 6 in one carrier 5. Immediately the plaster moulds 6 are lifted they are removed, inverted, and the clay body or article therein is separated from the mould 6, the damp mould being then placed in one of a series of upper chambers 51 which receives heat issuing through perforations 52 and 53, from an upper heat chamber 54 in the wall 37. This upper heat chamber 54 in the wall 37 is heated by branch pipes 55 (shown dotted at Fig. 1) extending from the main hot air pipe 34. The outer end of each of the branch pipes 55 (Fig. 1) is provided with a damper 56 to control the supply of heat to the drying chambers 51 extending all round and forming part of the skeleton movable frame 2. When the moulds 6 in the drying chambers 51 have been conveyed round the machine they are dry and are placed in the carriers 5 again at position R (Fig. 2ᵃ) to be filled with clay slip at position S and treated as before described. The clay slip is stored in an ark 57 or other suitable receptacle placed at a suitable height above the machine. From the ark 57 is a slip supply pipe 58 which supplies the slip to the filling machine 26, a ball and ball valve being employed to keep the slip at a predetermined height in the tank or filling machine 26. Any suitable formation of filling machine may be employed to fill a series of plaster moulds 6 simultaneously but I prefer my improved filling apparatus for which a separate patent has been applied for on August 15, 1922, Serial Number 582,078, and will now be briefly described. This type of filling apparatus 26 is illustrated at Figs. 12, 13 and 14 and consists of a tank 59 having a ball valve 60 (ball and lever not shown) to keep the slip at a constant level in a similar way to a water cistern. A series of slip receptacles 61 are fixed to a frame 62 capable of being raised and lowered on guide rods 63 by a cable 64 fixed to the frame 62 and passing over guide pulleys 65 and having its end connected at 66 (see Fig. 3) to a two-armed lever 67 fulcrumed at 68 to a bracket 69 fixed to the stationary pillar or support 15. The cam 71 is arranged in a different plane from the lever 69 and its pivot pin 68, so that it can revolve without striking either of them. The two arm lever 67 carries a roller 70 to make rolling contact with a cam 71 fixed on the vertical shaft 12 which also operates the mechanism for the step by step motion required to move the skeleton framework 2. As the cam 71 (Fig. 3) rotates the roller end of the two-armed lever 67 is moved outwards on its fulcrum 68 by the periphery of the cam 71 which action draws the cable 64 and lifts the frame 62 and slip receptacles 61 in pouring position as shown at Fig. 13, four moulds 6 in one carrier 5 being filled simultaneously. As the slip receptacles 61 are rising to the pouring position (Fig. 13) an arm 72 carrying a roller 73 and fixed on the frame 62 makes contact with a projection or bracket 74 fixed on the front of the slip tank 59 causing it to tip over (see Fig. 13) the bottom frame 62 being then vertical. A rounded projection 75 on the frame 62 makes contact with the spring 76 as shown at Fig. 13 and puts extra tension on the spring 76 to bring the frame 62 back again inside the tank 59 (see Figs. 12 and 14) when the position of the cam 71 (Fig. 3) will allow it. When the receptacles 61 are being raised they are full of slip which is sufficient to cast one cup in each mould.

A rotary agitator 77 on a shaft 78 is operated by an endless rope 79 passing over pulleys 80, the said rope 79 passing over a grooved pulley 81 on the main driving shaft 9 (Fig. 1).

The plaster moulds 6 are constructed with an annular groove 6ᵃ for two spring clips 82 on the tilting carrier 5 to take into and retain it during its conveyance and tipping to dispose of surplus slip.

Where two or more machines are employed they are operated step by step from one driven shaft 9 (Fig. 1), the hot air for blasting the clay body and for drying the damp plaster moulds after use is obtained from the pipes 55 and 34 in the same manner as described when operating one machine, the surplus slip discharged from the moulds passes down the trough 29 into an ark or well 30 as shown at Fig. 10.

By employing heat chambers 51 for drying the plaster moulds after use I dispense with the use of separate potters stoves as will be understood. I do not herein claim the means for filling the molds 6, which I have described and shown, as the same are claimed in the said separate application filed on August 15, 1922, Serial Number 582,078.

What I claim as my invention and desire to secure by Letters Patent is:—

1. In a casting machine, a frame mounted to revolve on a vertical axis, horizontal mold carriers pivoted in the frame with their pivots arranged radially of its axis, molds arranged in the said mold carriers, and means for tilting the mold carriers on their pivots to discharge surplus material from the molds.

2. The combination, with a casting machine as set forth in claim 1, of friction brake mechanism which operates automatically to hold the frame stationary at predetermined intervals.

3. The combination, with a casting machine as set forth in claim 1, of a series of spaced projections on the frame, and a stationary spring plate against which the projections bear one after another, thereby holding the frame stationary at predetermined intervals.

4. The combination, with a casting machine as set forth in claim 1, of spring clips secured to the said mold carriers and engaging with depressions in the molds so as to retain them in the mold carriers when tilted.

5. The combination, with a casting machine as set forth in claim 1, of means for forcing air into the molds after the surplus material has been discharged from them, to remove moisture from the articles.

6. The combination, with a casting machine as set forth in claim 1, of a stationary air chamber arranged adjacent to the frame and provided with nozzles which project over the molds and afford a means for forcing air into them.

7. The combination, with a casting machine as set forth in claim 1, of means for forcing hot air into the molds after the surplus material has been discharged from them, and a ring secured to the frame at the inner ends of the mold carriers and operating to retain the hot air in proximity to the molds.

8. The combination, with a casting machine as set forth in claim 1, of a stationary chamber for hot air arranged adjacent to the outer ends of the mold carriers, and radial air pipes which project inwardly from the said chamber towards the axis of the frame and which have downwardly projecting nozzles for forcing a separate current of air into each mold.

9. The combination, with a casting machine as set forth in claim 1, of lever mechanism for raising the molds in the mold carriers when horizontal and after the articles have been formed in them.

10. The combination, with a casting machine as set forth in claim 1, of a stationary support arranged below the mold carriers, a plate provided with guides which are slidable vertically in the said support, said plate having means for engaging with a plurality of molds simultaneously, and a lever for operating the said plate so as to raise the molds in the mold carriers.

11. The combination, with a casting machine as set forth in claim 1, of a drying chamber for the empty molds secured to the said frame and revolving with it and arranged above the level of the mold carriers.

12. The combination, with a casting machine as set forth in claim 1, of a stationary trough arranged below the said mold carriers and adapted to receive the surplus material from them when the molds are tilted.

13. The combination, with a casting machine as set forth in claim 1, of a series of projections on the frame, and lever mechanism provided with a catch device which engages with the projections one after another and revolves the frame step by step at predetermined intervals.

14. A casting machine as set forth in claim 1, and in which the means for tilting the pivoted mold carriers comprise friction rollers secured to their pivots, and a stationary friction plate which engages with the peripheries of the said rollers one after another as the frame is revolved.

15. A casting machine as set forth in claim 1, and in which the means for tilting the pivoted mold carriers comprise friction rollers secured to their pivots, stationary friction plates arranged at predetermined distances apart, one above and the other below the said rollers and engaging with their peripheries one after another as the frame is revolved, said means having also stops which limit the tilting movements of the mold carriers in each direction.

16. The method of manufacturing articles of the class set forth, which consists in arranging molds in horizontal mold carriers, filling the molds with clay slip, moving the filled molds horizontally for a predetermined distance, titling the mold carriers to discharge the surplus slip from the molds, restoring the molds to their normal positions, and then forcing blasts of air into the molds to remove moisture from the clay bodies, thereby fitting the bodies for subsequent removal from the molds.

17. The method of manufacturing teacups, breakfast cups and other vessels or articles of pottery consisting in placing the plaster moulds in horizontal carriers on a frame rotatable step by step, automatically filling the plaster moulds with clay slip, conveying the moulds with clay slip a predetermined distance, automatically tipping the carriers to discharge the surplus slip from the moulds, moving back each carrier with its moulds and clay body therein to the initial position, subjecting each clay body whilst in the plaster mould to a blast or current of air, dislodging the plaster moulds from their carriers, and removing the clay body or clay article from the plaster mould substantially as described.

In testimony whereof I have hereunto set my hand in the presence of two witnesses.

ELIJAH BROOKES.

Witnesses:
J. BENTON,
J. H. COPESTAKE.